March 5, 1963
R. C. BOWERS
3,080,027
CLUTCH
Filed March 11, 1959
3 Sheets-Sheet 1
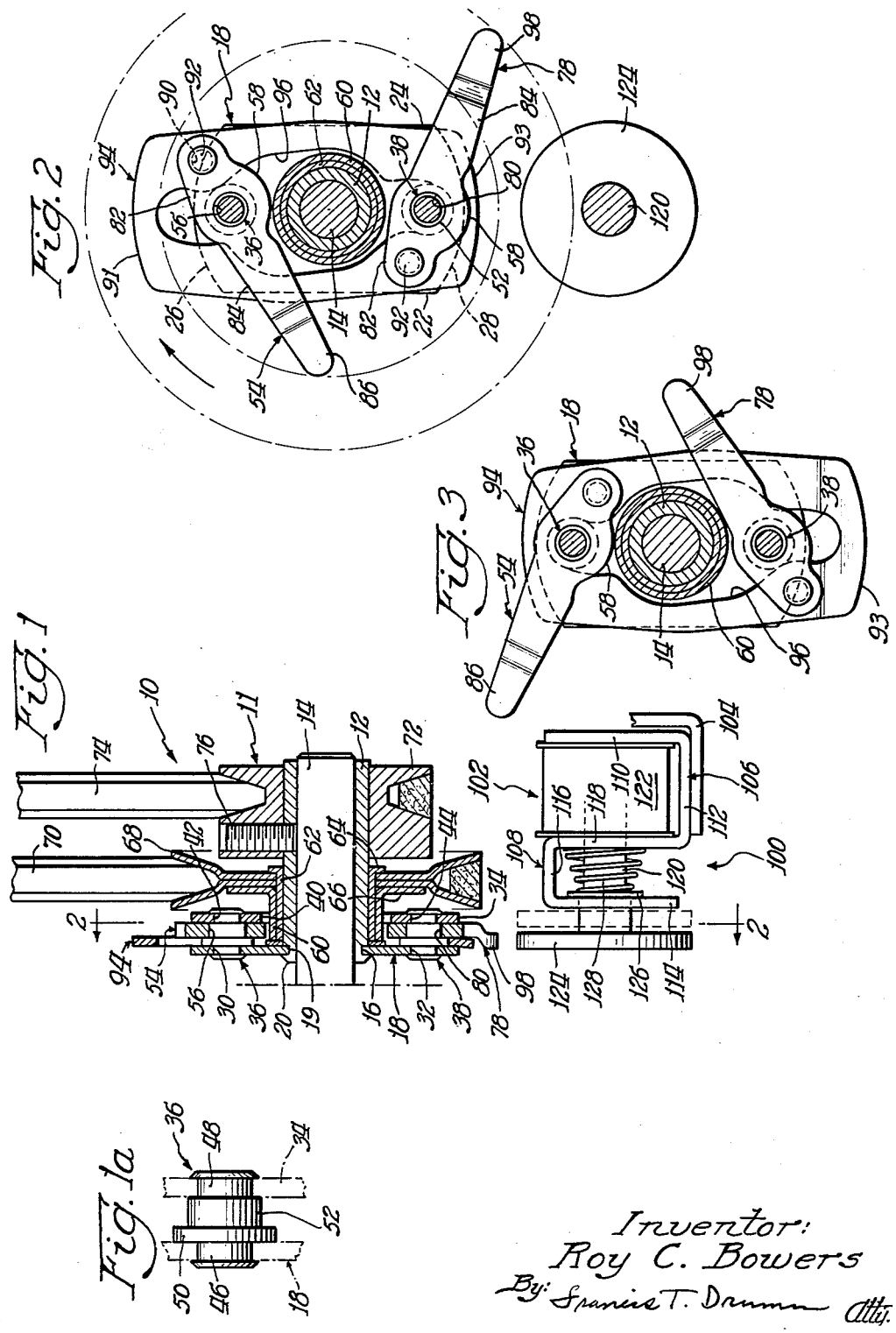
Inventor:
Roy C. Bowers
By: Francis T. Drumm Atty.

March 5, 1963 R. C. BOWERS 3,080,027
CLUTCH
Filed March 11, 1959 3 Sheets-Sheet 2
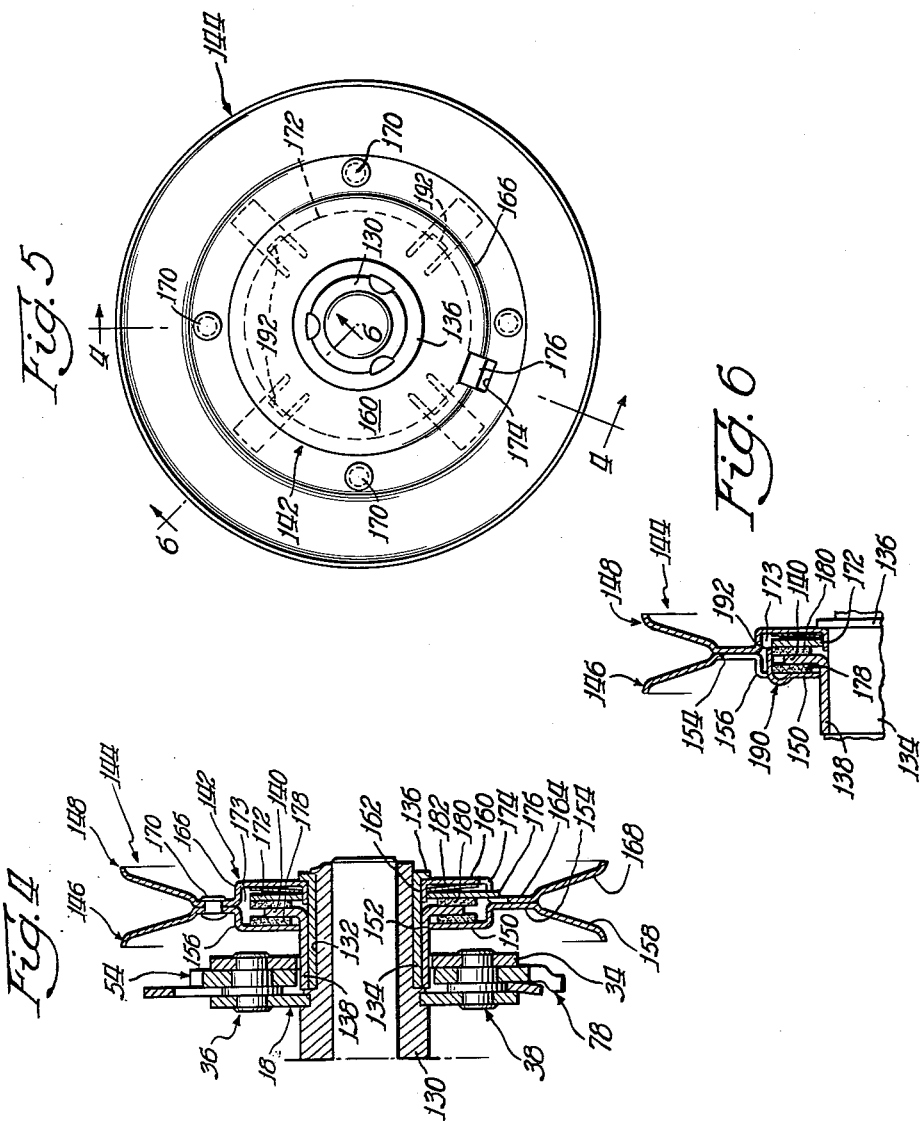
Inventor:
Roy C. Bowers
By: Francis T. Drumm Atty.

March 5, 1963 R. C. BOWERS 3,080,027
CLUTCH
Filed March 11, 1959 3 Sheets-Sheet 3
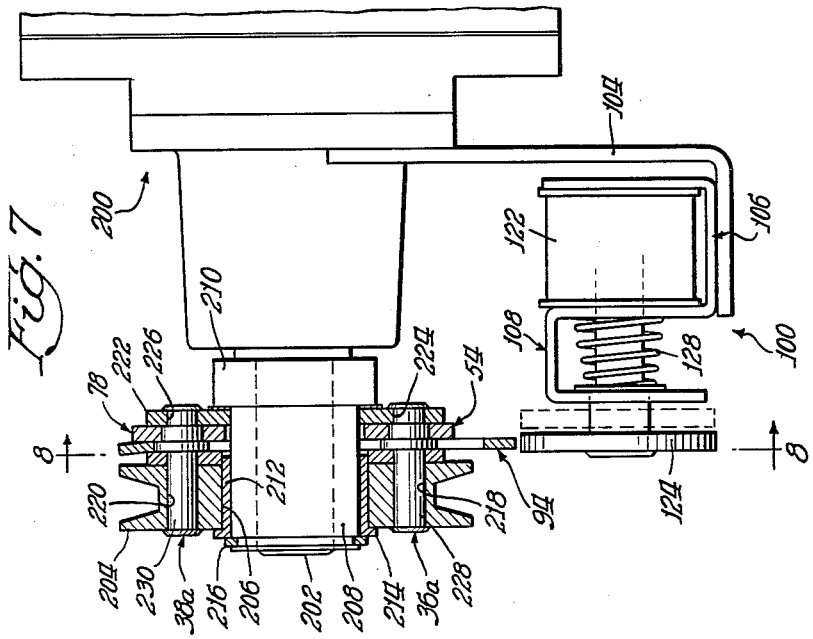
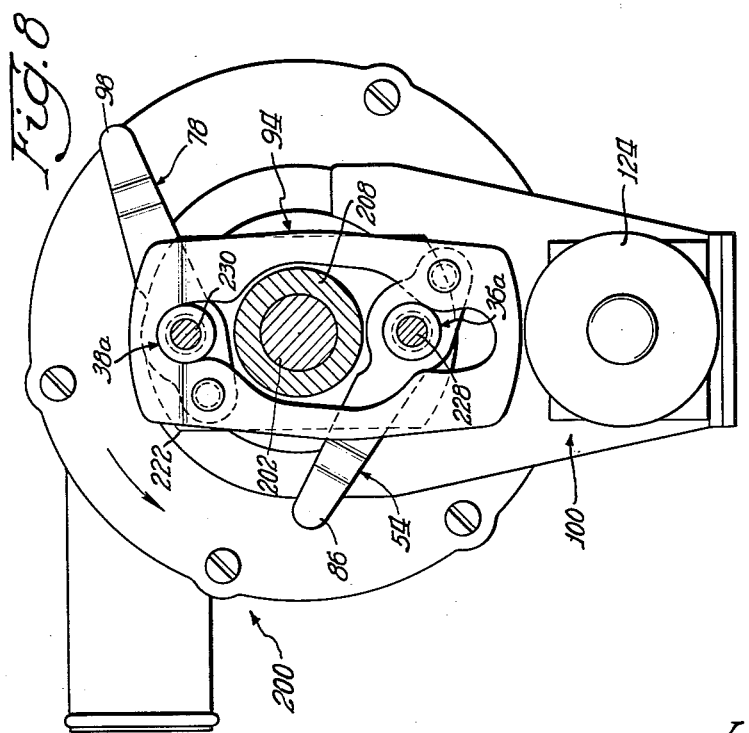
Inventor:
Roy C. Bowers
By: Francis T. Drumm Atty.

United States Patent Office 3,080,027
Patented Mar. 5, 1963

3,080,027
CLUTCH
Roy C. Bowers, Bellwood, Ill., assignor to Borg-Warner Corporation, Chicago, Ill., a corporation of Illinois
Filed Mar. 11, 1959, Ser. No. 798,660
12 Claims. (Cl. 192—26)

This invention relates to clutches and more particularly to a clutch of the gripper type in which concentric driving and driven elements may be connected.

A principal object of the invention is to provide a clutch of the type described which is characterized by efficiency and effectiveness and improved functional characteristics.

Another object of the invention is to provide a clutch in accordance with the principal object wherein a tiltable gripper is drivingly connected to the driving element and is pivotally mounted about an axis parallel to the axis of rotation of the concentric driving and driven elements so as to be selectively movable into engagement with the driven element.

Another object of the invention is to provide a clutch in accordance with the preceding objects wherein means are provided for connecting the tiltable gripper and the lever arm so that pivotal movement of the tiltable gripper in one direction affords a similar increment of movement of the lever in the opposite direction and wherein control means are provided for selectively engaging the gripper or the lever for engaging or disengaging the clutch as desired.

Another object of the invention is to provide a clutch of the stated type wherein the driven element comprises a sleeve mounted in surrounding relation to the driving element wherein a pulley is frictionally and yieldably connected to the sleeve wherein the gripper and the lever are provided at their outer ends with tabs offset axially and wherein the control assembly is operable to engage the lever arm tab to rotate the gripper into engagement with the output member or the gripper tab to rotate the gripper out of engagement with the output member.

A further object of the invention is to provide a clutch of the character described in which the driving element includes a sleeve connectible to a driving shaft, a drive plate connected to the drive sleeve, a second plate spaced axially from the drive plate, parallel trunnions interposed between the drive plate and the second plate on opposite sides of the axis of rotation of the sleeve, an output sleeve surrounding the input sleeve, a tiltable gripper mounted for pivotal movement on one of the trunnions of the driving sleeve, the gripper being rotatable in one direction for locking engagement with the driven sleeve and in the opposite direction to disengage the driven sleeve, a lever pivotally mounted on the other of the trunnions, link means connecting the lever and the gripper so that rotation of the lever in one direction effects rotation of the gripper in the opposite direction.

Another object of the invention is to provide a clutch in accordance with the preceding objects wherein the lever tab in the disengaged position of the clutch describes a circle of greater diameter than the gripper tab, wherein the gripper tab in the engaged position of the clutch describes a circle of greater diameter than the lever tab and wherein the control assembly includes a solenoid and a disc normally coplanar with one of the tabs and selectively movable by the solenoid into the plane of the other of the tabs to engage the other of the tabs and pivot the same about the axis of its trunnion to engage or disengage the clutch as desired.

A further object of the invention is to provide a clutch in accordance with the preceding objects in which the means connecting the gripper and the lever takes the form of a dynamically balanced control link, wherein the gripper and the lever are identical except that the lever is turned side for side and wherein the gripper is provided with a cam surface for engaging the driven sleeve.

A further object of the invention is to provide a clutch in which the driving sleeve is mounted in surrounding relation to the driven sleeve in which a driving pulley is connected to the driving sleeve, in which a tiltable gripper is pivotally mounted on a trunnion secured to the pulley, in which a lever is pivotally mounted on a trunnion connected to the pulley at the opposite side of the axis of rotation of the pulley, in which link means are provided for effecting rotation of the gripper in one direction by rotating the lever in the opposite direction and vice versa, and in which means are provided for locking the gripper in engaged position.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is an elevational sectional view illustrating a clutch system embodying the principles of the present invention;

FIGURE 1a is an enlarged elevational view of a trunnion forming a part of the clutch system of FIGURE 1;

FIGURE 2 is an elevational view, partly in section, taken substantially on line 2—2 of FIGURE 1 and showing the clutch in disengaged position;

FIGURE 3 is a view similar to FIGURE 2 but showing the clutch in engaged position;

FIGURE 4 is an elevational sectional view of a modified form of the present invention taken substantially on line 4—4 of FIGURE 5;

FIGURE 5 is an end view of the pulley assembly illustrated in FIGURE 4;

FIGURE 6 is a fragmentary sectional view taken substantially on line 6—6 of FIGURE 5;

FIGURE 7 is an elevational view, partly in section, of a clutch system made in accordance with a further modified form of the invention; and FIGURE 8 is a view taken substantially on line 8—8 of FIGURE 7.

Referring now to the drawings and more particularly to FIGURE 1 the clutch system of the principal form of the present invention is indicated generally by reference numeral 10 and includes an input element or driving member 11 which includes an input sleeve 12, preferably of hard metal such as steel or the like, illustrated as being rotatably mounted on a stub shaft 14. At one end of the sleeve 12 is an annular groove 16 in which is received a drive plate 18, also preferably of steel or the like having a central opening 19. Preferably the groove 16 is formed by swaging the outer edge of the sleeve against the plate 18 as at 20. The plate 18, as shown best in FIGURES 2 and 3, is of generally rectangular configuration and has parallel side edges 22 and 24 and arcuate end edges 26 and 27 preferably formed about an axis coincident with the axis of the sleeve 12. Openings 30 and 32 are formed in the plate 18 at points oppositely disposed with respect to the axis of the sleeve 12 and adjacent the arcuate edges 26 and 28 respectively. A plate 34, similar to the plate 18 is maintained in axially spaced relation with respect to the plate 18 by means of trunnions 36 and 38. It will be noted that the plate 34 has a central opening 40 of greater diameter than the central opening 19 of the plate 18. Openings 42 and 44 are formed in the plate 34 and in the assembled position of the parts illustrated are in register with the openings 30 and 32 respectively of the plate 18.

As shown clearly in FIGURE 1a the trunnion 36 is of the step type and includes end portions 46 and 48, of equal diameter, received in the openings 30 and 42 respectively and swaged to the plate 18 and the plate 34 respectively. Between the end portions 46 and 48 is a portion 50 of relatively large diameter and a portion 52 of a diameter larger than that of the portions 46 and 48 but less than the diameter of the portion 50. The purpose of the portion 50 will hereafter be described.

Referring now to FIGURES 2 and 3 a sprag arm or tiltable gripper 54 is provided adjacent one end thereof with an opening 56 in which is received the portion 52 of the trunnion 36. The sprag arm 54 may be rotated about the trunnion 36 in a manner hereafter described and is provided on one side thereof with a cam surface 58. Upon rotation of the sprag arm 54 in a clockwise direction, as viewed in FIGURES 2 and 3, the cam surface 58 is brought into snubbing engagement with an output sleeve 60 which is mounted in surrounding relation to the sleeve 12. A bushing 62 having radially outwardly extending thrust flange 64 is interposed between the sleeve 12 and the sleeve 60. A radially outwardly extending flange 66 is formed with the sleeve 60 and is secured by any suitable means to an output pulley 68 which may receive an output belt 70.

The sleeve 12 is illustrated as being driven by means of an input pulley 72 and an input belt 74 from a suitable source of rotative power. A setscrew 76 is utilized to connect the pulley 72 and the sleeve 12 in driving relation. It will be appreciated that the sleeve 12 may be driven by other means than the pulley 72. For instance, the shaft 14 may be of the driving type. The trunnion 38 is identical to the trunnion 36 and will not be further described in detail. The same reference numerals as that of trunnion 36 are utilized to designate the several constituent parts of the trunnion 38.

Referring again to FIGURES 2 and 3, as lever arm 78, identical to the sprag arm 54, is provided with an opening 80 adjacent one end thereof for reception of the portion 52 of the trunnion 38. It will be noted that the sprag arm 54 is divided by the opening 56 into a foot section 82 and an elongated outwardly extending leg portion 84 of tapered configuration and having at the outer end an axially offset tab 86. An opening 90 is formed in the foot portion 82 for reception of a pin 92 which passes through a registering opening at one side of a control link 94. The control link 94 has an irregularly formed central opening 96 through which passes the sleeve 12 and the trunnions 36 and 38. The shape of the boundary edges is similar to that of the plate 18 but the longitudinal length is slightly greater. The outer boundary is defined in part by an arcuate edge 91 adjacent the sprag arm 54 and an arcuate edge 93 adjacent the lever arm 78.

The lever arm 78, as mentioned previously, is identical to the sprag arm 54 with the exception that a tab 98 is formed at the outer end of the section 84 and extends axially oppositely into a different plane from that of the tab 86. In all other respects the same reference numerals have been utilized to designate identical parts of the lever arm 78. It will be noted that the sprag arm 54 is turned side for side to form the lever arm 78. As a result, the cam surface 58, of the lever arm 78 is located on the opposite side of the axis of the trunnion and is never brought into contact with the sleeve 60. As in the case of the sprag arm 54 a pin 92 connects the foot portion 82 of the lever arm 78 to the control link 94 at a point oppositely disposed from the axis of the sleeve 12. Stated another way, the several pins 92 are located on opposite sides of intersecting planes passing through the axis of rotation.

It will be noted that in the disengaged position of the clutch illustrated in FIGURE 2 the tab 98 of the lever 78 describes a circle of greater diameter than that of the tab 86 of the sprag arm 54, while in the engaged position of the clutch illustrated in FIGURE 3, the tab 86 describes a circle of greater diameter than that of the tab 98 of the lever arm 78. It will be noted also that in the engaged position of the clutch illustrated in FIGURE 3 the cam surface 58 of the sprag arm 54 is shown in wrap-up position with the output sleeve 60.

To disengage the clutch of the present invention, the sprag arm 54 is rotated in a manner hereafter apparent in a counterclockwise direction so that it assumes the position shown in FIGURE 2.

To engage the present clutch the lever arm 78 is rotated in a counterclockwise direction in a manner hereafter described about the axis of the trunnion 38 and because of the connection of the lever arm 78 with the link 94, the link 94 is drawn downwardly thus rotating the sprag arm 54 about the axis of the trunnion 36 so that it assumes the engaged position illustrated in FIGURE 3. It will be appreciated that the link 94 is moved in the opposite direction when the sprag arm 54 is rotated to disengage the clutch in the manner above set forth.

As mentioned previously, the respective tabs 86 and 98 are offset axially in different planes. Whichever tab is outermost i.e. describes a circle of greater diameter, will be engaged and moved inwardly for engagement or disengagement of the clutch, as the case may be, by a control assembly 100 which will now be described in detail.

The control assembly 100 includes a solenoid 102 carried by a bracket 104 which may be secured to any suitable stationary support. The solenoid 102 is of the S-frame type and includes a first portion 106 secured to the bracket 104 and a second portion 108. The first portion 106 has an arm 110 and a base portion 112 while the second section 108 has an arm 114 and a base portion 116. An arm 118, integral with the base portion 112 and the base portion 116 joins the two portions. The arms 118 and 114 are apertured for sliding reception of a plunger 120 which may be moved to the right, as viewed in FIGURE 1, upon energization of a coil 122. At the outer end of the plunger 120 is affixed a disc 124. Upon energization of the coil 122 the disc 124 is moved from the position shown in solid lines to the position shown in dot-and-dash lines. The plunger 120 is formed with a radial flange 126 and a frusto-conical spring 128 extends between the flange 126 and the arm 118 to return the disc 124 to the position shown in solid lines. It will be noted that the disc 124 in the solid line position is coplanar with the tab 98 of the lever 78 while in the dot-and-dash lines it coincides with the axial plane of the tab 86. When the tab 98 is engaged by the disc 124 the lever arm 78 is rotated counterclockwise, as viewed in FIGURE 2, so that the disc 124 is no longer in the path of travel of the tab 98. It will be appreciated that in the engaged position of the clutch the coil 122 is de-energized and the disc 124 remains coplanar with the tab 98. The sprag arm 54 is rotated in a clockwise direction in the manner above set forth until it reaches the engaged position illustrated in FIGURE 3.

When disengagement is desired, the coil 122 is energized and the disc 124 is moved to the dot-and-dash line position in a plane coincident with the tab 86 of the sprag arm 54. At this time the tab 86 describes a circle of greater diameter and disc 124 engages the tab 86 of the sprag arm 54 for rotation of the sprag arm 54 in a counterclockwise direction to disengage the cam surface 58 from the outer periphery of the sleeve 60. The lever arm 78 is returned by means of the link 94 to the position shown in FIGURE 2.

Assuming clockwise rotation of the sleeve 12, as shown by the arrow in FIGURE 2, engagement of the tab 98 by the disc 124 initiates rotation of the sprag arm 54 and complete engagement of the cam surface 58 with the periphery of the sleeve 60 is effected by the resultant of the centrifugal forces acting upon the combination of sprag arm 54, control link 94 and lever arm 78. To prevent bouncing when the arms are returned to the position shown in FIGURE 2, the arcuate edge 93 of link 94 is bent axially to the left as shown best in FIGURE 1, to provide frictional resistance and serve as a lock means to hold the clutch in a disengaged position.

In FIGURE 4 is shown a modified form of the present invention in which the drive plate 18 is affixed to a drive sleeve 130 in a manner similar to the principal form of the invention. The drive sleeve 130 is provided with a reduced portion 132 for reception of a bushing 134 similar to bushing 62 of the principal form of the invention and having a radially outwardly extending thrust flange 136. Sprag arm 54 and lever arm 78 are pivotally mounted on trunnions 36 and 38 respectively which are arranged in parallelism on opposite sides of the axis of rotation of the sleeve 130 and extend between the plate 18 and plate 34. The arms 54 and 78 operate as in the principal form of the invention. In this modified form of the invention, however, an output sleeve 138 surrounds the bushing 134 and is selectively engaged by the sprag arm 54, as in the principal form of the invention. In this instance, the output sleeve 138 has a radially outwardly extending flange 140 which forms a part of a torque limiting assembly 142. The torque limiting assembly 142 also includes an output pulley 144 consisting of a first section 146 and a second section 148. The section 146 includes a radially extending hub portion 150 having a central opening 152 in limited spaced relation to the sleeve 138, an annular base portion 154 axially offset from the hub portion 150 and separated therefrom by a rounded shoulder 156 and an outwardly flaring socket portion 158. The section 148 includes an annular hub section 160 provided with an annular axially extending flange 162 which rests on the bushing 134 and whose inner periphery is identical to the inner periphery of the output sleeve 138, a base portion 164 offset axially from the axial plane of the hub section 160 and extending into abutting relation with the base portion 154 of the section 146, thus forming a rounded shoulder 166, and an outwardly flaring portion 168. The base portions 154 and 164 are secured each to the other by a plurality of circumferentially spaced rivets 170. An annular disc 172 is mounted for limited axial movement within an annular enclosure 173 formed by the pulley sections 146 and 148. In order to prevent inadvertent rotation of the disc 172, an opening 174 is formed in the section 148 at the shoulder 166 and a tab 176, integrally formed with the disc 172 extends therethrough.

Interposed between the flange 140 of the output sleeve 138 and the hub portion 150 of the pulley section 146 is an annular disc of friction material 178. Similarly, an annular disc of friction material 180 is interposed between the flange 140 and the disc 172. The disc 172 is normally urged to the left, as viewed in FIGURE 4, by a Belleville washer 182 which is mounted within the enclosure 173 and extends between the base portion 160 and the disc 172 for urging the friction discs 178 and 180 into frictional engagement with the flange 140 with the base portion 150 of the pulley section 146, and with the disc 172. By this arrangement torque impulses imparted to the output sleeve 138 are frictionally absorbed prior to transmission to the pulley 144. In addition, the torque limiting assembly 142 permits slippage between the output sleeve 138 and the pulley 144 when the torque of the sleeve 138 is excessive. The Belleville washer 182 may be calibrated to effect any desired degree of resistance and is desirably positioned as shown under compression so that the pressure exerted is in the flat portion of the familiar Belleville spring curve. As a result, the resistance is the same even when the friction discs wear. By this arrangement, the torque transmitted to the pulley 144 may be limited and slippage of the belt and consequent wear precluded.

According to an important feature of the present invention means are provided to center the friction discs 178 and 180 to preclude inadvertent radial movement. To this end a plurality of circumferentially spaced tongues 190 are struck from the pulley section 146 as seen best in FIGURE 6. These tongues are formed from parts of the hub portion 150, the shoulder 156 and the base portion 154 and are connected to the hub portion 150. Before the section 146 is joined to the section 148 the tongues 190 are bent into a small radius arc and then are bent to form axially extending feet 192 in overlying relation to the outer peripheries of the friction discs 178 and 180 to retain these discs in the operative position illustrated, in concentric relation to the flange 140 and annular disc 172.

In FIGURE 7 is illustrated a further modified form of the invention illustrated in conjunction with a pump 200 having a drive shaft 202. In this instance, rotative power may be transmitted to the shaft 202 for operation of the pump 200 by means of an input pulley 204 which is preferably of solid construction and provided with a central opening 206. An output sleeve 208 may be affixed to the shaft 202 and is provided at one end with an outwardly extending flange 210. A bushing 212 having a radially outwardly extending thrust flange 214 is interposed between the pulley 204 and the output sleeve 208. The pulley 204 is axially positioned by the flange 214 and axial movement of the bushing 212 to the left, as viewed in FIGURE 7, is precluded by a snap ring 216 received in a suitable groove in the outer periphery of the output sleeve 208.

A pair of openings 218 and 220 are formed in the pulley 204 on opposite sides of the axis of rotation of the sleeve 208. In this instance, an annular driven plate 222 is secured to the output sleeve 208 adjacent the shoulder 210. Openings 224 and 226, on opposite sides of the axis of rotation of the sleeve 208, are formed in the plate 222. Extending between the openings 218 and 224 and between the openings 220 and 226 are trunnions 36a and 38a respectively, similar to the trunnions 36 and 38 of the principal form of the invention with the exception that the trunnions 36a and 38a are provided with elongated end portions 228 and 230 respectively which are received in the openings 218 and 220 respectively of the pulley 204. Sprag arm 54 is mounted for pivotal movement on the trunnion 36a while lever arm 78 is mounted for pivotal movement on the trunnion 38a. As in the principal form of the invention, each of the arms 54 and 78 is connected to the link 94 for simultaneous movement of the innermost arm when the outermost arm is engaged by disc 124 of the control assembly 100 which is identical to the control mechanism of the principal form of the invention.

In FIGURES 7 and 8 the clutch is illustrated in the disengaged position with the outer end of the arm 78 outermost. The disc 124, in this instance, normally resides in the same axial plane as the tab 86 of the arm 54. When engagement of the clutch is desired the coil 122 is energized and the disc 124 retracted to the dot-and-dash line position, into the path of travel of the tab 98 of the lever arm 78. Upon engagement of the disc 124 with the tab 98, the clutch is shifted to the engaged position, as will be apparent.

By the arrangement of the modified form of the invention a clutch is provided which is normally disengaged and which may be intermittently engaged by energization of the coil 122. It will be apparent that the control mechanism of the principal form of the invention may be arranged for operation of the clutch only at predetermined intervals. Likewise, the control mechanism of the form of the invention shown in FIGURES 7 and 8 may be arranged so that the disc 124 lies in the same axial plane as the tab 98 of the arm 78 and so that the clutch would then be normally engaged, rather than disengaged.

It will be appreciated that the gripper or sprag 54 is locked in the engaged position by the wrap-up of the cam surface 58 of the output sleeve. This wrap-up occurs because of centrifugal forces acting on the outer end of the sprag 54 when the tab 98 of the lever arm 78 is engaged by the disc 124. Likewise the sprag 54 is moved to the disengaged position illustrated in FIGURE 2 by centrifugal force acting on the outer end of the lever arm 78 to complete the movement initiated by the control disc 124. As stated previously, the present clutch is additionally locked in the disengaged position by the frictional resistance of the link 94 when the bent end thereof is wedged between the drive plate and the lever arm. The engagement of the disc 124 with the several tabs merely initiates the movement of the arms. The further rotation of the arms is afforded by centrifugal force as the trunnions revolve about the axis of rotation in the manner above set forth.

While I have described my invention in connection with certain specific constructions and arrangements, it is to be understood that this is by way of illustration and not by way of limitation and the scope of my invention is defined solely by the appended claims which should be construed as broadly as the prior art will permit.

I claim:

1. A clutch system comprising an input sleeve adapted to be drivingly connected to a source of rotative power, a drive plate secured to said sleeve for rotation therewith, an opening in said drive plate adjacent each curved end, a second plate in axially spaced relation to said drive plate, said second plate being substantially identical to said drive plate and having a pair of spaced openings in register with the openings of said drive plate and a central opening of relatively large diameter for reception of said drive sleeve, a pair of trunnions mounted in the registering openings in said drive plate and said second plate, an elongated sprag arm rotatably mounted on one of said trunnions, an output sleeve mounted in surrounding relation to said input sleeve the inner periphery of said second plate being in spaced relation to said output sleeve, said sprag arm having a cam surface selectively engageable with said output sleeve, a pulley connected to said output sleeve, an elongated lever arm pivotally mounted on the other of said trunnions, a control link surrounding said input sleeve, said control link being provided with a pair of openings one on each side of the axis of said input sleeve, said sprag and said lever each being provided with an opening adjacent one end thereof, a pin passing through the opening of said sprag and said lever and one of the openings of said control link so that either said sprag or said lever may be rotated about the axis of its associated trunnion for pivotal movement of the sprag about the axis of its associated trunnion for locking engagement with said output sleeve and selective rotation of said pulley.

2. A clutch system comprising an input sleeve adapted to be drivingly connected to a source of rotative power, a drive plate secured to said sleeve for rotation therewith, an opening in said drive plate adjacent each end, a second plate in axially spaced relation to said drive plate, said second plate being identical to said drive plate and having a pair of spaced openings in register with the openings of said drive plate and a central opening of relatively large diameter for reception of said drive sleeve, a pair of trunnions mounted in the registering openings in said drive plate and said second plate, an elongated sprag arm rotatably mounted on one of said trunnions, an output sleeve mounted in surrounding relation to said input sleeve, the inner periphery of said second plate being in spaced relation to said output sleeve, said sprag arm having a cam surface selectively engageable with said output sleeve, a pulley connected to said output sleeve, an elongated lever arm pivotally mounted on the other of said trunnions, a control link connecting the inner end of said sprag arm with the inner end of said lever arm, said sprag arm having an axially offset tab at the outer end thereof, said lever arm having a tab at the outer end thereof offset axially oppositely from the tab of said sprag arm, said sprag tab in the engaged position of the sprag arm describing a circle of a diameter greater than that described by the lever tab, and control means for selectively rotating said sprag and said lever to engage or disengage the clutch, said control means comprising a solenoid having a plunger, a disc carried by the outer end of said plunger, said disc being movable upon energization of said solenoid from a normal position coplanar with said lever tab to a position in the path of travel of said sprag tab to engage said sprag tab, so as to rotate said sprag out of engagement with said output sleeve and rotate said lever arm through the medium of said control link to a position in which the lever tab describes a circle greater in diameter than said sprag tab, said disc being movable upon de-energization of said solenoid to the position coplanar with and in the path of travel of said lever tab whereby said lever tab is engaged by said disc, said lever is rotated, and said sprag is oppositely rotated through the medium of said control link so that the cam surface thereof again engages said output sleeve.

3. A clutch comprising an input member, an output member, said output member including a sleeve journaled on said input member, said input member including an elongated sprag mounted for rotate about an axis radially spaced from the axis of rotation of said sleeve, said sprag being rotatable in one direction normal to the axis of said sleeve into engagement with said sleeve and rotatable in the opposite direction out of engagement with said sleeve, and lock means for securing said sprag in disengaged position.

4. A clutch comprising an input member, an output member including a sleeve, said input member including an elongated sprag arm and an elongated lever arm, said sprag arm and said lever arm being mounted for rotation about axes radially spaced from the axis of rotation of said sleeve and in parallelism therewith, link means connecting said sprag arm and said lever arm so that rotation of one of said arms in one direction effects rotation of the other of said arms in the opposite direction, said lever arm being rotatable in one direction to effect rotation of said sprag arm in the opposite direction into locking engagement with said sleeve, said sprag arm being rotatable in said one direction out of locking engagement with said sleeve, and means for locking said sprag arm in a position out of engagement with said sleeve.

5. A clutch comprising an input member, an output member including a sleeve, said input member including a sprag arm and a lever arm each rotatable about an axis radially spaced from the axis of said sleeve and in parallelism therewith, link means connecting said sprag arm and said lever arm, said sprag arm having at the outer end thereof an axially offset tab, said lever arm having at the outer end thereof a tab offset axially oppositely from the sprag arm tab, said lever arm being rotatable in one direction to afford rotation of said sprag arm in the opposite direction through the medium of said link means so that said sprag arm lockingly engages said sleeve, the tab of said sprag arm in the engaged position of the clutch describing a circle of greater diameter than that described by the tab of said lever arm, the tab of said lever arm in the disengaged position of the clutch describing a circle of greater diameter than the tab of said sprag arm, and control means selectively interposable into the plane of the outermost of the arms to engage or disengage the clutch as desired.

6. A clutch comprising an input member, an output member including a sleeve, said input member including a sprag arm and a lever arm each rotatable about an axis radially spaced from the axis of said sleeve and in parallelism therewith, link means connecting said sprag arm and said lever arm, said sprag arm having at the outer end thereof an axially offset tab, said lever arm having at the other end thereof a tab offset axially oppositely from the sprag arm tab, said lever arm being rotatable in one direction to afford rotation of said sprag arm in the opposite direction through the medium of said link means so that said sprag arm lockingly engages said sleeve, the tab of said sprag arm in the engaged position of the clutch describing a circle of greater diameter than that described by the tab of said lever arm, the tab of said lever arm in the disengaged position of the clutch describing a circle of greater diameter than that of the tab of said sprag arm, and control means selectively interposable into the plane of the outermost of the arms to engage or disengage the clutch as desired, said control means including an element movable from an axial position coplanar with the lever arm tab to a position coplanar with the sprag arm tab, said element in the latter position being in the path of travel of said sprag arm tab and adapted to engage said sprag arm tab for rotation of said sprag arm to the disengaged position.

7. A clutch system comprising an input sleeve adapted to be drivingly connected to a source of rotative power, a drive plate secured to said sleeve for rotation therewith, said drive plate being of generally rectangular configuration, an opening in said drive plate adjacent each curved end, a second plate in axially spaced relation to said drive plate, said second plate being substantially identical to said drive plate and having a pair of spaced openings in register with the openings of said drive plate and having a central opening of relatively large diameter for reception of said drive sleeve, a pair of trunnions mounted in the registering openings in said drive plate and said second plate, an elongated sprag arm rotatably mounted on one of said trunnions, an output sleeve mounted in surrounding relation to said input sleeve, the inner periphery of said second plate being in spaced relation to said output sleeve, said sprag arm having a cam surface selectively engageable with said output sleeve, a pulley connected to said output sleeve, an elongated lever arm pivotally mounted on the other of said trunnions, a control link connecting the inner end of said sprag arm with the inner end of said lever arm, said sprag arm having an axially offset tab at the outer end thereof, said lever arm having a tab at the outer end thereof offset axially oppositely from the tab of said sprag arm, said sprag tab in the engaged position of the sprag arm describing a circle of a diameter greater than that described by the lever tab, control means for selectively rotating said sprag and said lever to engage or disengage the clutch, said control means comprising a solenoid having a plunger parallel to the axis of said sleeve, a disc carried by the outer end of said plunger, said disc being movable upon energization of said solenoid from a normal position coplanar with said lever tab to a position in the path of travel of said sprag tab to engage said sprag tab, so as to rotate said sprag out of engagement with said output sleeve and rotate said lever arm through the medium of said control link to a position in which the lever tab describes a circle greater in diameter than said sprag tab, said disc being movable upon de-energization of said solenoid to the position coplanar with and in the path of travel of said lever tab whereby said lever tab is engaged by said disc, said lever is rotated, and said sprag is oppositely rotated through the medium of said control link so that the cam surface thereof again engages said output sleeve, and means for locking said sprag arm in the disengaged position.

8. A clutch in accordance with claim 7 wherein said control link comprises a plate of generally rectangular configuration interposed between said drive plate and said sprag and lever arms and wherein one end of said control link is bent axially to afford locking of the sprag arm in the disengaged position.

9. A clutch in accordance with claim 8 wherein the end of said control link adjacent said lever arm is bent axially so as frictionally to hold said lever arm thus preventing inadvertent engagement.

10. A clutch comprising an input pulley, a drive plate axially spaced from said pulley, a pair of diametrically opposed trunnions extending between said pulley and said drive plate, an output sleeve adapted to be affixed to an output shaft, a sprag arm rotatably mounted on one of said trunnions, a lever arm rotatably mounted on the other of said trunnions, and link means connecting said sprag arm and said lever arm so that upon rotation of said lever arm in one direction said sprag arm rotates in the opposite direction to engage said output sleeve and so that upon rotation of said sprag arm in the opposite direction out of engagement with said output sleeve said lever arm is rotated in said one direction.

11. A clutch in accordance with claim 10 wherein said arms are locked in one position or the other and in which control means are provided to terminate the locking relation and to permit centrifugal force to move the arms from one position to the other position.

12. A clutch in accordance with claim 10 wherein said sprag arm is in wrap-up relation in the engaged position of the clutch, wherein said link means is locked in the disengaged position of the clutch, and wherein control means is provided to engage said sprag arm to terminate the wrap-up relation to afford radially outward movement of the lever arm under the influence of centrifugal force, or to engage said lever arm to terminate the locking relation thereof and to permit rotation of said sprag arm under the influence of centrifugal force to the wrap-up position.

References Cited in the file of this patent
UNITED STATES PATENTS

| | | |
|---|---|---|
| 902,103 | McFarland | Oct. 27, 1908 |
| 2,136,381 | Hile | Nov. 15, 1938 |
| 2,306,730 | Holmes | Dec. 29, 1942 |
| 2,566,031 | Nilson | Aug. 28, 1951 |
| 2,633,957 | Gardinor et al. | Apr. 7, 1953 |
| 2,675,835 | Kiekhaefer | Apr. 20, 1954 |
| 2,753,703 | McIntyre | July 10, 1956 |
| 2,901,067 | Nicholson | Aug. 25, 1959 |